United States Patent [19]
Nowicki

[11] 3,740,931
[45] June 26, 1973

[54] AUTOMOBILE AND TRUCK CARBURATOR AIR INTAKE FILTERS

[76] Inventor: Raymond M. Nowiciki, 30 Linn Road, Nutley, N.J. 07110

[22] Filed: Dec. 15, 1971

[21] Appl. No.: 208,075

[52] U.S. Cl. .............................. 55/274, 55/DIG. 34
[51] Int. Cl. ............................................. B01d 35/14
[58] Field of Search ........................ 55/274, DIG. 34

[56] References Cited
UNITED STATES PATENTS
2,753,831  7/1956  Davies ........................... 55/DIG. 34
3,529,407  9/1970  Nowicki ............................... 55/274

FOREIGN PATENTS OR APPLICATIONS
754,496  8/1956  Great Britain ....................... 55/274

*Primary Examiner*—Bernard Nozick

[57] ABSTRACT

An annular pleated filter element with a anti-pollution warning air whistle cavity resonator compression flange device secured to the filtering paper through an aperture within a pleat.

1 Claim, 5 Drawing Figures

PATENTED JUN 26 1973      3,740,931

INVENTOR

Raymond M. Nowicki

AUTOMOBILE AND TRUCK CARBURATOR AIR INTAKE FILTERS

This invention relates to automobile and truck carburetor air intake filters and includes an annular pleated filter element in combination with a anti-pollution warning device.

Our major problem all over the country today is automobile air pollution and what is being done in reducing it. Automobile owners, gas stations and repair shops do not have a way to determine the condition of automobile and truck carburetor air intake filters, a major cause of auto air pollution. The only means they have to determine the condition of auto air filters is compressed air hose and a drop light. This is not the way to determine the condition of a carburetor air intake filter and if it is up to manufacturers specifications to see if it is in need of replacement. In the mean time automobiles and trucks are burning excessive gas, excessive oil, experiencing a loss of power with engines stalling causing many accidents on the road. Unnecessary wear on the engine, improper mixture of air and fuel are major causes of carburetor fires, and cause excessive smoke from the exhaust system, all put together we have auto air pollution.

It is therefore an object of this invention to improve carburetor air intake filter elements with a calibrated vacuum sensing air whistle cavity resonator compression flange, to warn the operator of a motor vehicle which is being operated that it is polluting the air due to a faulty carburetor air intake filter element which needs immediate replacing. The warning sound from the calibrated vacuum sensing air whistle cavity resonator compression flange will only sound when the carburetor air intake drops below automobile manufacturers specifications. With the running of the engine the warning sound will indicate that the carburetor air intake filter element is faulty.

The warning device will continue to sound until the carburetor air filter element is replaced with a new one to help reduce auto exhaust pollution.

These prominent objects are accomplished by the novel construction and arrangement of parts hereinafter described and shown in the accompanying drawings, constituting an essential component of this disclosure, and in which.

Figure 1:
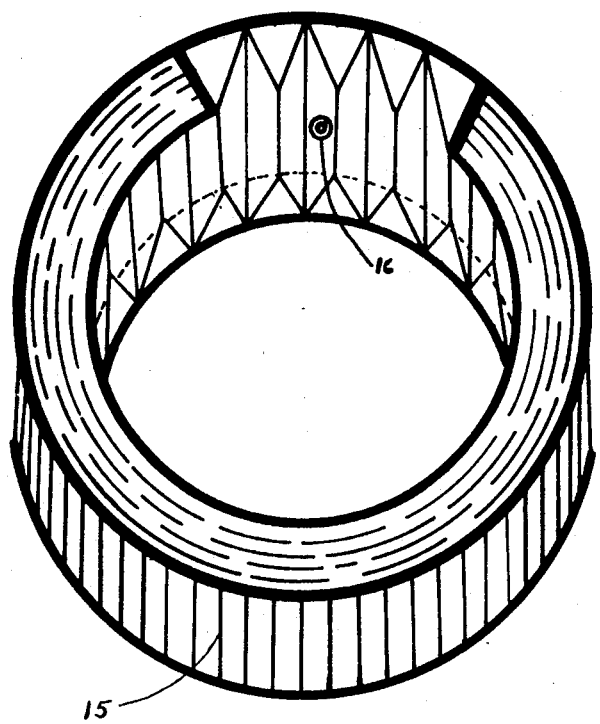
FIG. 1 illustrates my new invention an improved carburetor air intake filter element in combination with a anti-pollution warning device which is a calibrated vacuum sensing air whistle cavity resonator compression flange secured to a pleat within the element.
Figure 2:
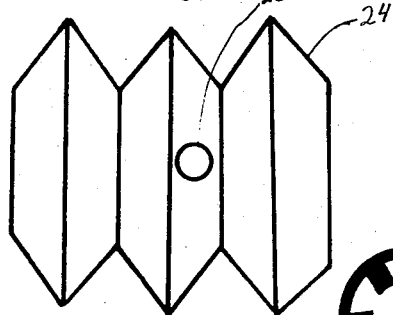
FIG. 2 shows the aperture within a pleat of the filtering paper.
Figure 3:
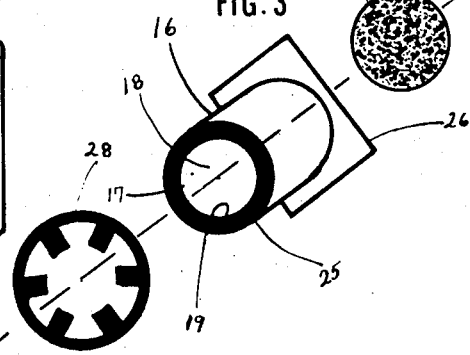
FIG. 3 shows a disassembled view of the calibrated vacuum sensing air whistle cavity resonator compression flange device.
Figure 4:
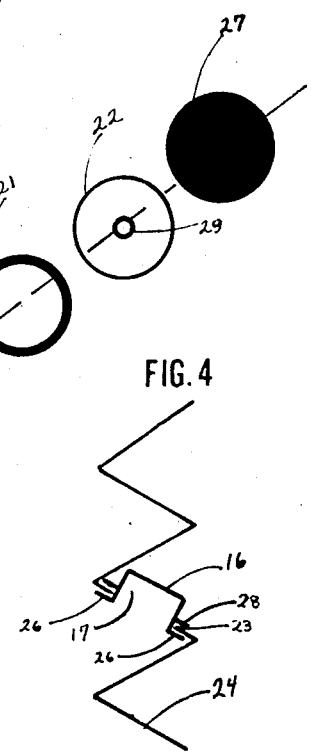
FIG. 4 shows the anti-pollution warning whistle compression flange device inserted into the aperture within a pleat of the filtering paper secureing the device to the filtering paper by slipping over the collar of device an external retaining ring.
Figure 5:
FIG. 5 shows a cut away view.

Referring in greater detail to the drawings the new invention will be seen to consist of a automobile carburetor air intake filter element 15, with a anti-pollution warning device 16 FIG. 1. The device 16 FIG. 3 having an aperture 17 therethrough at the air inlet end 18 having an annular seat 19 within the aperture 17, inserted and supported across the aperture 17 a dust protective screen 20 and O ring 21 seated on the inner annular seat 19, into the aperture 17 a calibrated vacuum sensing air whistle cavity resonator 22 having no moving parts is press fitted and supported across the aperture 17 seated on the O ring 21 securing a dust tight fit within the aperture 17 supported across the aperture 17 is a flexible dust cover 27. The callor 25 of the device 16 is then inserted into the aperture 23 within the filtering paper 24 within a pleat FIG. 2 the filtering paper 24 is positioned and seated on the flange 26 of the device 16 slipping over the collar 25 of the device 16 an self seating external ring 28 secureing the device 16 to the filtering paper 24 and aperture 23 within a pleat FIG. 4, the suction of air through the aperture 23 within the filtering paper 24 and through the aperture 17 within the device 16 activating the calibrated vacuum sensing air whistle cavity resonator 22 having no moveing parts. whereby the suction of air through the orfice 29 in the calibrated resonator 22 producing a warning whistleing sound and forceing out the flexible dust cover 27 having a free flow of air through the device 16 indicateing a clogged air filter element 15. FIG. 1.

It is to be understood that the device 16 and warning cavity resonator 22 will vary in size and design to accommodate due to different sizes of air filters.

With the new invention installed and in operation in its factory specified carburetor base and housing it will maintain carburetor air intake too manufacturers specifications and will help reduce auto exhaust pollution.

From the foregoing it will be seen that a novel and unusually practical device for the purpose has been shown and described in its best known enbodiments; therefore that is claimed as new and sought to secure by Letters Patent, is,-

1. An air intake annular pleated filter element in combination with an anti-pollution warning device comprising a calibrated vacuum sensing air whistle cavity resonator compression flange haveing an aperture therethrough having an annular seat at the air inlet within the aperture, inserted and supported across the aperture a dust protective screen and O-ring seated on the inner annular seat into the aperture having inserted and press fitted a calibrated vacuum sensing air whistle cavity resonator having no moveing parts which is supported across the aperture and seated on the O-ring within the aperture supported across the aperture a flexible dust protective cover, having an aperture within the filtering paper within a pleat into which the collar of the warning resonator compression flange device is inserted into the aperture within the filtering paper within a pleat, the filtering paper is positioned and seated on the flange of the device slipping over the collar of the device a self seating external ring secureing the device to the papering paper and aperture within a pleat having the suction of air through the aperture within the filtering paper and through the aperture within the device and through the orifice of the calibrated vacuum sensing air whistle cavity resonator forceing out the flexible dust protective cover activating the calibrated vacuum sensing air whistle cavity resonator producing a whistleing warning sound indicating a clogged air filter element.

* * * * *